Feb. 11, 1941.　　　　E. H. VEDDER　　　　2,231,695
RESISTANCE HEATER
Filed Dec. 23, 1937　　　　2 Sheets-Sheet 1

WITNESSES:
Leon M. Garman
Leon J. Taza

INVENTOR
Edwin H. Vedder.
BY
F. W. Lyle.
ATTORNEY

Feb. 11, 1941.          E. H. VEDDER                    2,231,695
                       RESISTANCE HEATER
                    Filed Dec. 23, 1937          2 Sheets-Sheet 2

WITNESSES:                                    INVENTOR
Leon M. Garman                              Edwin H. Vedder.
Leon J. Faya                                BY  F. W. Lyle.
                                                ATTORNEY Patented Feb. 11, 1941

2,231,695

UNITED STATES PATENT OFFICE 2,231,695

RESISTANCE HEATER

Edwin H. Vedder, Forest Hills, Pa., assignor to Westinghouse Electric & Manufacturing Company, East Pittsburgh, Pa., a corporation of Pennsylvania Application December 23, 1937, Serial No. 181,342

20 Claims. (Cl. 219—20)

My invention relates to photo-sensitive control systems and it has particular relation to photo-sensitive control apparatus for a resistance heater.

In a resistance heater a material is heated by passing an electric current through it. The radiant energy light emitted from the heated material is directed to a photo-sensitive device which is used to control the electrical circuit through the material when the desired temperature is attained. This control system is satisfactory when the material to be heated is in the form of metal bars having a small cross-sectional area. But when materials of relatively large cross-sectional area are being heated, it has been found that when the surface of the material reaches the desired temperature, the center of the material is at a comparatively low temperature. When the heating circuit is opened in response to the temperature at the surface of the material, the temperature throughout the material becomes equalized and the resultant temperature of the material is lower than desired.

It is, accordingly, an object of my invention to provide apparatus for controlling the heat supply to a material of relatively large cross-section in such manner that after the heating circuit is finally opened no appreciable decrease in temperature by reason of heat flow between the parts of the material will occur.

A further object of my invention is to precisely limit the temperature of a body being heated electrically to a maximum predetermined value.

A still further object of my invention is to obtain a more even temperature distribution throughout a body that is being heated electrically.

A more general object of my invention is to provide means for interrupting the power to a work circuit a predetermined number of times and for reapplying the power a predetermined time after each interruption.

More specifically stated, it is an object of my invention to provide a system that shall operate to temporarily discontinue the application of heating power to a body when it has reached a predetermined temperature and to permanently discontinue the application of heating power after more than one application has been made.

According to my invention, a material is heated electrically and when the desired surface temperature is reached a photo-sensitive device intercepting radiant energy from the heated material is utilized to disconnect the material from the source of heating power. Since the amount of radiant energy emitted by the material is substantially proportional to the temperature, the photo-sensitive device may be arranged to function at a predetermined temperature which I shall herein designate as the trip temperature.

It will be understood that the radiant energy may be emitted from a source other than the body being heated. It may be emitted from a source, the temperature of which varies as a function of the temperature of the body being heated.

As has been hereinabove explained, the surface of a relatively heavy material cools rapidly when it is disconnected from the source of heating power. In accordance with my invention, heating power is reapplied to the material a predetermined time after the power has been first disconnected because the surface temperature of the material has reached the desired value. The time interval between the disconnection and the reapplication is such that before the power is reapplied, the temperature of the material has become equalized. The heating continues after the reapplication of power until the photo-sensitive device functions to open the heating circuit again. When the material is sufficiently heated the circuit is opened permanently. While my invention shows that only two applications of heating power are applied to the material it will readily be understood that any predetermined number of power applications may be made before the power circuit is opened.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
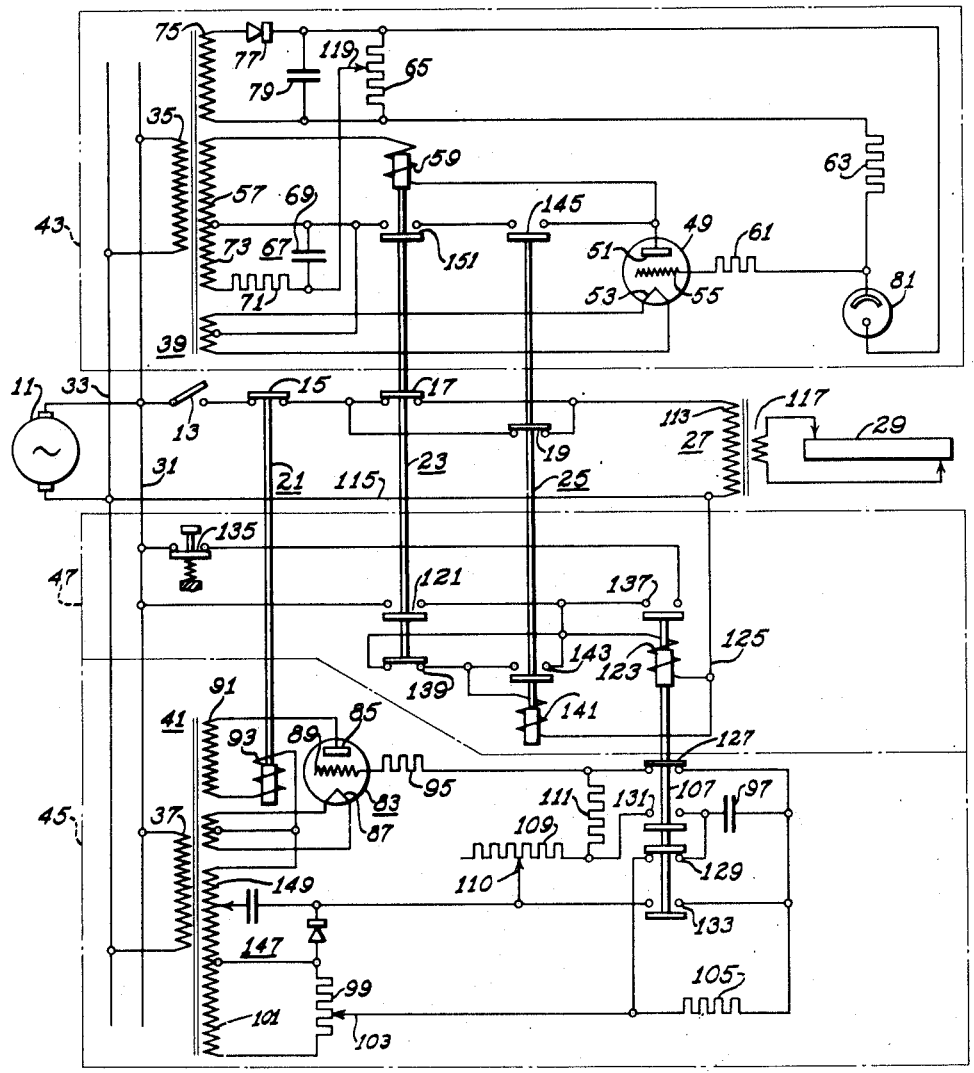
Figure 1 is a diagrammatic representation of a preferred embodiment of my invention.

The apparatus shown in Fig. 1 comprises a source of alternating current 11 which supplies heating power to a bar 29 through a disconnecting switch 13, contacts 15, 17 and 19 of electromagnetic switches 21, 23 and 25, respectively, and a transformer 27. The bar 29 is of relatively large cross-sectional area. The generator 11 also supplies power through conductors 31 and 33 to primary windings 35 and 37 of transformers 39 and 41, respectively. Through transformer 39, electrical energy is supplied to the photo-sensitive circuit designated as 43 in the upper portion of the diagram. Through transformer 41 energy is supplied to the timer circuit designated as 45 in the lower portion of the diagram. The auxiliary control circuit designated as 47 is shown energized directly from the generator 11 and it is arranged with photo-sensitive circuit 43 and the timer circuit 45 to control the sequence of operation.

The photo-sensitive circuit 43 comprises an electric discharge device 49 having an anode 51, a cathode 53 and a control electrode 55. While a discharge device having a gaseous medium and a hot cathode is preferred, in the practice of my invention other discharge devices well known in the art, for example, high vacuum tubes or mercury pool tubes may be utilized.

An alternating potential is impressed between the anode 51 and the cathode 53 of the discharge device 49 from a winding 57 of the transformer 39 through an operating coil 59 of the electromagnetic device 23. The grid 55 is connected to the cathode 53 through a current limiting resistor 61, a grid resistor 63, a source of variable unidirectional biasing potential shown as potentiometer 65, and a source of dephased alternating potential derived from a dephasing circuit 67 of the usual type. The dephasing circuit 67 may consist of a capacitor 69 and a resistor 71 connected in series across a winding 73 of transformer 39. One terminal of the dephasing circuit is connected to cathode 53 and the other terminal is connected to the potentiometer 65. The potentiometer 65 receives its energy from a unidirectional potential source which includes a winding 75 of transformer 39, a rectifier 77, preferably by the dry-disc type, and a filter condenser 79.

A photo-sensitive device 81, preferably a phototube of the cesium oxide type, and the grid resistor 63 are connected in series across the unidirectional potential source to control the operation of the electric discharge device 49. It will readily be understood that other photo-sensitive devices such as a photo-voltaic cell or a selenium cell may be utilized. Moreover, a radiometer, a bolometer or any suitable device responsive to radiant energy may also be used.

The timer circuit 45 shown as an electronic timer comprises a second discharge device 83, similar to discharge device 49 having an anode 85, a cathode 87 and a control electrode or grid 89. My invention is, of course, not limited to the use of electronic timing means and other timing means well known in the art, such as a relay having a dash-pot or a motor-operated timer may be used in lieu of the timer 45.

An alternating potential is impressed between the anode 85 and the cathode 87 of the discharge device 83 from a winding 91 of the transformer 41 through an operating coil 93 of the electromagnetic device 21. As shown in Fig. 1, the discharge device 83 is maintained in the deenergized condition by connecting the grid 89 to the cathode 87 through a current limiting resistor 95, a condenser 97 and a source of adjustable alternating current potential. The adjustable potential is supplied through potentiometer 99 and the secondary winding 101 of transformer 41. The grid 89 and cathode 87 act as a rectifier while the condenser 97 is charged. The magnitude of the charge and thus the time delay interval of the electronic timer is partly determined by the setting of the arm 103 of the potentiometer 99. A resistor 105 shown connected in parallel circuit relation with the condenser 97 is used as a discharge path for the condenser when the power is disconnected. An electromagnetic device such as a transfer relay 107, when actuated by electromagnetic device 23, reverses the polarity of condenser 97 in the grid circuit and establishes a discharge circuit through the adjustable timing resistor 109. The position of the arm 110 on resistor 109 also affects the time delay interval of the electronic timer 45. A resistor 111 prevents any appreciable discharge of the condenser 97 from the grid 89 to cathode 87 of the discharge device 83.

An electromagnetic device such as lock-out relay 25 is actuated by and cooperates with the electromagnetic switch 23 to permanently open the heating circuit from the generator 11 to the transformer.

A better understanding of my invention may be had by a consideration of the operation of the system. Assume that the generator 11 is supplying energy to the transformers 39 and 41, and that the metal bar 29 has been properly connected in the secondary circuit of the transformer 27. To initially energize the heating circuit, the disconnecting switch 13 is closed. The switch 13 may remain closed as long as generator 11 is operating. The heating circuit extends from the upper terminal of generator 11, through the disconnecting switch 13, the contacts 15 of electromagnetic device 21, the pair of contacts 17 and 19 of electromagnetic devices 23 and 25, respectively, which are connected in parallel relation, the primary winding 113 of transformer 27, conductor 115 and to the lower terminal of the generator 11. Once the heating circuit is energized, the metal bar is heated by the electrical current passing through it from the secondary winding 117 of transformer 27. As long as the radiant energy emitted by the metal bar 29 is below a predetermined value, the discharge device 49 is maintained in the deenergized condition by a biasing potential, the magnitude of which is determined by the setting of an arm 119 of the potentiometer 65 in the grid circuit.

The photo-tube 81 is so positioned with respect to the metal bar 29 that it intercepts sufficient radiant energy to function properly at the predetermined trip temperature. When the bar 29 attains the desired temperature, the photo-tube 81 passes sufficient current from winding 75 of transformer 39, through the rectifier 77 and the grid resistor 63 to overcome the biasing potential and energize the discharge device 49. A circuit is now completed from the upper end of the winding 57 of transformer 39, through the operating coil 59 of the electromagnetic switch 23, the anode 51 and the cathode 53 of the discharge device 49 back to the winding 57. The electromagnetic device 23 is thus actuated, closing contacts 121 to energize the operating coil 123 of the transfer relay 107. The circuit for the operating coil 123 extends from the energized conductor 31 through contacts 121, operating coil 123, conductors 125 and 115 to the energized conductor 33. The transfer relay 107 is actuated to open contacts 127 and 129 and to close contacts 131 and 133, thus reversing the polarity of the condenser 97 with respect to the grid 89 and connecting the condenser so that it will discharge into the timing resistor 109 through a circuit which extends from one terminal of the condenser 97 through the contacts 131, the resistor 109, the contacts 133 and to the other terminal of the condenser 97. The discharge device 83 immediately becomes energized, thus completing the circuit through the operating coil 93 of electromagnetic switch 21 which is actuated to open the contacts 15, thus deenergizing the heating circuit.

The surface of the metal bar 29 begins to cool because of the transfer of heat from the surface to the center, and because of the decreased radiant energy on the photo tube 8. When this occurs, the grid bias on the discharge device 49 becomes more negative and thus the discharge device 49 is deenergized and the operating coil 59 of the electromagnetic device 23 is also deenergized. The coil 123 of the transfer relay 107 does not become deenergized at this time because it has established its own holding circuit which extends from the energized conductor 31, through closed contacts of a push button 135 and the contacts 137 of the transfer relay in parallel with the contacts 121 of the electromagnetic device 23. However, contacts 139 reclose to complete the circuit through the operating coil 141 of the locking relay 25 which extends from the energized conductor 31 through the contacts of the push button 135, the contacts 137, the contacts 139, operating coil 141, conductors 125 and 115 to energized conductor 33. The locking relay 25 is actuated to close contacts 143 to establish a holding circuit for its operating coil 141 and to close contacts 145 and open contacts 19, thus preparing the respective circuits for the next operation of electromagnetic device 23.

The time that contacts 15 of electromagnetic device 21 remain open depends on the rate of discharge of the condenser 97. When the transfer switch 107 was actuated the grid circuit was changed so that it now extends from the grid 89 through current limiting resistor 95, resistor 111, adjustable timing resistor 109, a source of unidirectional potential 147 and the upper portion of transformer winding 149 to the cathode 87. The source of unidirectional potential 147 is of such a polarity as to make the grid potential more negative with respect to the cathode potential as the charge from condenser 97 decreases. At a time predetermined by the setting of the adjustable timing resistor 109 and the potentiometer 99, the grid potential becomes sufficiently negative for the discharge device 83 to become deenergized, thus deenergizing the electromagnetic device 21 and reclosing the heating circuit.

The temperature of the metal bar 29 now again increases and when a predetermined temperature is reached, the discharge device 49 again becomes energized, thus energizing the operating coil of electromagnetic device 59 as hereinabove described. Because locking relay 25 is now in the energized condition and its contacts 19 are open as hereinabove stated, the heating circuit is opened immediately when electromagnetic device 23 is actuated to open contacts 17. The heating circuit remains in the open condition because the electromagnetic device 23 establishes its own holding circuit which extends from the upper end of transformer winding 57 through operating coil 59, the now closed contacts 145 and 151 back to the winding 57. Contacts 121 and 139 have no effect at this time on the auxiliary control circuit 47 because operating coils 123 and 141 are maintained in the energized condition by a holding circuit hereinabove described.

As soon as the heating circuit is permanently opened, the metal bar 29 may be automatically ejected from the heating circuit or it may be removed by any other well known means and replaced by another metal bar of the same type. To repeat the heating cycle, the push button 135 is depressed to open the auxiliary control circuit and thus deenergize the operating coils 123 and 141. Contacts 145 of locking relay 25 are then actuated to deenergize operating coil 59. The heating circuit is closed and the second metal bar begins to heat. The apparatus and circuits are again in the condition shown in Fig. 1 with the exception that the disconnecting switch 13 is closed to admit the flow of electrical energy to the heating circuit. The heating cycle continues in the manner hereinabove described.

Figure 2:
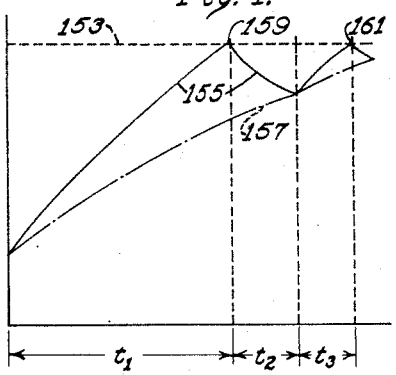
Fig. 2 is a chart which graphically illustrates the operation of my invention.

The operation of the system is illustrated graphically in Fig. 2 in which the temperatures of the metal bar 29 are plotted vertically and time is plotted horizontally. The horizontal dotted line 153 represents the trip temperature which is substantially the temperature to which the metal bar is to be heated. The position of the photo-tube 81 with respect to metal bar 29, and the arm 119 of potentiometer 65 are adjusted so that the photosensitive circuit 43 will function at the predetermined trip temperature 153. The full line curve 155 represents the temperatures at the surface of the metal bar 29 and the broken line curve 157 represents the temperatures at the center of the bar 29.

The surface temperature 155 of the metal bar 29 reaches the trip temperature 153 shown as the trip point 159 after the heating circuit has been energized for a time interval shown as $t_1$. At this point the photo-sensitive circuit 43 functions to initiate the timer 45 and open the heating circuit at contacts 15 of electromagnetic device 21. The end of time interval $t_1$, that is when the trip point is reached it will be noted that the temperature 157 at the center of the bar is considerably lower than the trip temperature 153. As soon as the heating circuit is opened, the temperatures of the metal bar begin to equalize. The timer 45 is adjusted so that it functions at the end of a second time interval $t_2$ when the temperature at the surface and the temperature at the center of the metal bar are substantially equal. Near the beginning of the time interval $t_2$ the photo-sensitive circuit 43 is deenergized and the locking relay 25 is energized, thus opening a branch of the heating circuit through contacts 19. At the end of time interval $t_2$, the contacts 15 reclose and thus reenergize the heating circuit. The temperature of the bar 29 again increases until a second trip point 161 is reached by the surface temperature 155. The photo-sensitive circuit 43 again functions and this time contact 17 of electromagnetic device 23 completes the opening of the heating circuit and it is maintained in the open condition while the metal bar 29 is ejected from the circuit.

If it is desired to obtain intermittent operation that is to have the heating cycle repeated continuously as long as the disconnecting switch 13 remains closed, it will only be necessary to reset the transfer relay 107 at the end of each heating cycle. This may be done in the circuit shown in Fig. 1 by adding to the electromagnetic device 21 a set of contacts that will close when the operating coil 93 is energized and connecting the contacts in series with the push button 135. In the modified system the lock out relay 25 will not be utilized.

Figure 3:
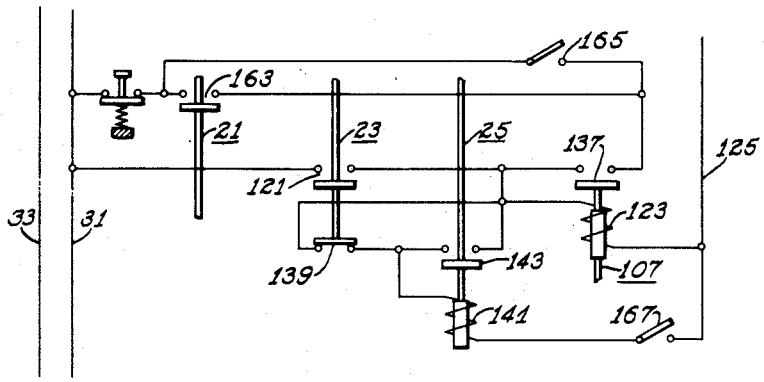
Figs. 3 and 4 are diagrammatic showings of modifications of a portion of Fig. 1.

If it is desired to change the circuit at will so as to obtain either operation as described hereinabove with reference to Fig. 1 or to obtain intermittent operation, then Fig. 1 may be modified as shown in Fig. 3. In Fig. 3 a set of contacts 163, added to electromagnetic device 21, are connected in the auxiliary control circuit 47 so that operating coil 123 of transfer relay 107 is deenergized at the end of the timing period of the timer 45. Thus the condenser 87 in the circuit of grid 89 may be recharged for the next cycle of operation. A circuit interrupting device such as a switch 165, shown connected in parallel with contacts 163, is utilized to establish a permanent holding circuit for the operating coils 123 and 141. When the switch 165 is in the open condition as shown in Fig. 3, intermittent operation is obtained. When switch 165 is closed, operation as described with reference to Fig. 1 is obtained. A switch 167 similar to and operated simultaneously with the switch 165 may be utilized to disconnect the operating coil 141 from the circuit during intermittent operation.

Figure 4:
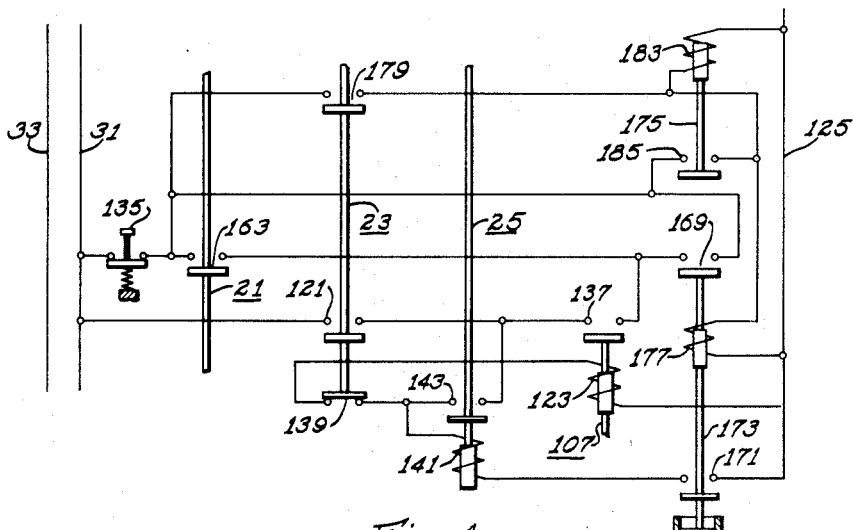

Fig. 4 shows how the change from intermittent operation to operation described with reference to Fig. 1 may be obtained automatically after a predetermined number of heating cycles have been completed. Fig. 4 is similar to the modification shown in Fig. 3, except that the switches 165 and 167 are replaced by contacts 169 and 171, respectively, of an adjustable timing device 173 such as a relay having a dash-pot or other means of obtaining an adjustable time interval that is longer than the interval obtained by the timer 45. A clock or motor operated timer may be utilized. An electromagnetic device 175 is utilized to establish a holding circuit for an operating coil 177 of the timer 173.

In Fig. 4 the operation is started as hereinabove described. When the contacts 121 close to initiate the operation of electronic timer 45, a set of contacts 179, also on electromagnetic device 23, close to energize the operating coil 177 of the timer 173 and an operating coil 183 of the electromagnetic device 175. A set of contacts 185 close immediately to establish a holding circuit for the operating coils 177 and 183. As long as contacts 169 and 171 remain open the contacts 163 of electromagnetic device 21 are actuated to reset the timer 45 at the end of each heating cycle. After operating coil 177 has been energized for a predetermined time interval the contacts are closed and the operation continues as described hereinabove with reference to Fig. 1.

The operating coil 183 and the contacts 169 and 171 may also be elements of a notching relay in which the contacts may be closed after the operating coil 183 has been energized a number of times predeterminable at will.

It will be understood that the trip temperature 153 in the apparatus shown in Fig. 1 may be changed by changing the magnitude of the grid bias obtained from potentiometer 65 by means of additional contacts associated with locking relay 25. The trip temperature may also be gradually changed through a predetermined series of values if a plurality of notching relay contacts are utilized to change the grid bias on the discharge device 49 if the operating coil of the notching relay is energized through a set of contacts associated with the electromagnetic device 23.

Similarly the timing interval $t_2$ of the electronic timer 45 may be varied for operation obtained as described hereinabove with reference to Fig. 4. The time interval $t_2$ when heating power is discontinued to allow the temperatures to equalize is repeated during each heating cycle. It is obvious that each succeeding interval for equalizing temperatures may be changed manually by adjusting the setting of either arm 103 or 110 of the potentiometers 99 and 110 respectively. This interval may also be gradually changed though a predetermined series of values if a plurality of notching relay contacts are utilized to change the setting of either arm 103 or 110 of potentiometers 99 and 110 respectively.

I do not wish to be restricted to the specific structural details, arrangement of parts or circuit connections herein set forth as various other modifications thereof may be effected without departing from the spirit and scope of my invention. I desire, therefore, that only such limitations shall be imposed as indicated in the appended claims.

I claim as my invention:

1. A system for controlling the flow of electrical energy from a source of energy to a work circuit including a work piece electrically connected in the said work circuit, comprising means for opening and closing the said work circuit, means for actuating the said closing means, photo-sensitive means responsive to a predetermined amount of radiant energy emitted by the work piece for actuating the said opening means, an adjustable timing means associated with the said opening and closing means for reclosing the said work circuit after a predetermined time interval, means associated with the said photo-sensitive means for reopening the said work circuit, and means for locking the said work circuit in the open condition.

2. In a system for controlling the temperature of a metal that is being heated electrically, in combination, means for increasing the temperature of the metal, photo-sensitive means responsive to radiant energy emitted by the hot metal for limiting the temperature of the metal to a predetermined maximum value, timing means cooperatively associated with the said photo-sensitive means for allowing the temperature within the metal to equalize, means for again increasing the temperature of the metal to a value limited by the said photo-sensitive means, and means cooperating with the said photo-sensitive means for locking out the said means for increasing the temperature when the predetermined maximum temperature is again reached.

3. Translating apparatus comprising means for opening and for closing a work circuit having a work piece, means for actuating the said closing means, means responsive to the radiant energy emitted by the said work piece for actuating the said opening means, timing means cooperating with said means responsive to radiant energy for again actuating the said closing means at a predetermined time, means for reverting the means responsive to radiant energy to its original condition to again actuate the said opening means, means for locking the said opening means in the open condition after the said opening means have been actuated by the said means responsive to radiant energy a predetermined number of times.

4. A heating system having a resistance type heater supplied from a power source through a circuit comprising radiation responsive means subjected to radiant energy emitted by the said heater, and timing means initiated by the said radiation responsive means for intermittently opening the said circuit and thereafter closing it after a time predeterminable at will said time being greater than the natural period of the mechanical operation of the radiation responsive means.

5. A heating system having a resistance type heater supplied from a power source through a circuit comprising radiation responsive means subjected to radiant energy emitted by the said heater, timing means initiated by the said radiation responsive means for intermittently opening the said circuit and thereafter closing it after a time predeterminable at will said time being greater than the natural period of the mechanical operation of the radiation responsive means and means responsive to the radiation-responsive means for permanently opening said circuit.

6. The method of heating a body with apparatus for transmitting current therethrough which comprises transmitting heating current until the temperature of the surface of the body attains a value predeterminable at will and then interrupting the transmission of the heating current for an interval of time predeterminable at will and thereafter again transmitting heating current until the surface of the said body again attains the same temperature and then again interrupting the transmission of the heating current.

7. Translating apparatus in a circuit comprising, radiation responsive means responsive to radiant energy for opening the said circuit, timing means cooperatively associated with and initiated by the said radiation responsive means for maintaining the said circuit open for a predetermined time interval greater than the natural period of the mechanical operation of the radiation responsive means.

8. Translating apparatus in a circuit having a source of radiant energy comprising, radiation responsive means responsive to radiant energy emitted by the said source if radiant energy for opening the said circuit, timing means controlled by the said radiation responsive means for maintaining the said circuit open for a predetermined time interval greater than the natural period of the mechanical operation of the radiation responsive means.

9. Translating apparatus in a circuit comprising, radiation responsive means responsive to radiant energy for opening the said circuit, timing means controlled by the said radiation responsive means for maintaining the said circuit open for a predetermined time interval greater than the natural period of the mechanical operation of the radiation responsive means, means for reclosing the said circuit, and means responsive to the said radiation responsive means for reopening the said circuit.

10. Translating apparatus in a circuit comprising, radiation responsive means responsive to radiant energy for opening the said circuit, timing means cooperatively associated with the said radiation responsive means for maintaining the said circuit open for a predetermined time interval, means for reclosing the said circuit, means responsive to the said radiation responsive means for reopening the said circuit and means for locking the said circuit in the open condition.

11. Translating apparatus in a circuit comprising radiation responsive means responsive to radiant energy for opening the said circuit, timing means cooperatively associated with the said radiation responsive means for maintaining the said circuit open for a predetermined time interval, means for reclosing the said circuit, means responsive to the said radiation responsive means for reopening the said circuit and means for locking the said circuit in the open condition after the said radiation responsive means has functioned to open the said circuit a predetermined number of times.

12. Translating apparatus in a circuit comprising radiation sensitive means responsive to radiant energy, timing means initiated by the said radiation responsive means for opening the said circuit and for reclosing the said circuit after a predetermined time interval greater than the natural period of operation of the radiation sensitive means.

13. Translating apparatus in a circuit comprising radiation sensitive means responsive to radiant energy, timing means initiated by the said radiation responsive means for opening the said circuit and for reclosing the said circuit after a predetermined time interval greater than the natural period of operation of the radiation sensitive means, and means controlled by the said radiation responsive means for reopening the said circuit.

14. Translating apparatus comprising a circuit, means responsive to radiant energy, timing means controlled by the said radiation responsive means for opening the said circuit and for reclosing the said circuit after a predetermined time interval greater than the natural period of operation of the radiation responsive means, means cooperating with the said radiation responsive means for reopening the said circuit, and means for locking the said circuit in the open condition.

15. In a heating system having a resistance type heater supplied from a power source through a circuit having opening and closing means, means for actuating the said closing means, photo-sensitive means responsive to radiant energy emitted by the said resistance type heater for actuating the said opening means, timing means cooperatively associated with the said photo-sensitive means and the said opening and closing means for maintaining the said opening means in the open condition for a predetermined time interval and for actuating the said closing means at the end of the time interval, means for again actuating the said opening means by the said photo-sensitive means, and means for locking the said opening means in the open condition.

16. In an electric heating system for a material of relatively large cross-sectional area, in combination, means for passing a current through said material, timing means responsive to the surface temperature of said material for interrupting the flow of current through said material for an interval sufficient to permit the temperature to approach equalization at a temperature substantially above that which it had initially, and means for thereupon passing a current through said material.

17. In an electric heating system for a material of relatively large cross-sectional area, in combination, means for passing a current through said material, means to interrupt said current when the temperature at the surface of said material reaches a predetermined value, timing means to reinitiate said current flow after an interval sufficient to permit the temperature at the surface to become substantially equal to the temperature at the center of said material, and means to again interrupt said current when the temperature at the surface of said material reaches said predetermined value.

18. In an electric heating system for a bar of relatively large cross-sectional area and with length several times the cross section, in combination, means for passing current through said bar from contact means adjacent one end to contact means adjacent other end of said bar, switch-means for controlling said current flow, means responsive solely to the temperature of the surface of said bar to open said switch-means when the surface temperature reaches a predetermined value, and time delay means reclosing said switch-means after a predetermined time interval.

19. In an electric heating system for a bar of relatively large cross-sectional area and with length several times the cross section, in combination, means for passing current through said bar from contact means adjacent one end to contact means adjacent other end of said bar, switch-means for controlling said current flow, means responsive solely to the temperature of the surface of said bar to open said switch-means when the surface temperature reaches a predetermined value, time delay means reclosing said switch-means after a predetermined time interval, means responsive to the temperature of the surface of said bar to open said switch-means when the surface temperature again reaches the predetermined value, and means for locking said switch-means in the open condition after the said switch-means have been actuated by said means responsive to temperature a predetermined number of times.

20. In an electrical heating system for a material in combination, means for passing a current through said material, means responsive to the surface temperature of said material for interrupting the flow of current through said material for a time interval sufficient to permit the temperature to approach equalization at a temperature substantially above that which it had initially, said interval being determined independently of the surface temperature of said material, and means for thereupon passing a current through said material.

EDWIN H. VEDDER.